Dec. 1, 1964   N. J. ZACHMAN   3,159,463
WEAR-RESISTANT COMPOSITE ARTICLE
Filed Nov. 24, 1961   2 Sheets-Sheet 1
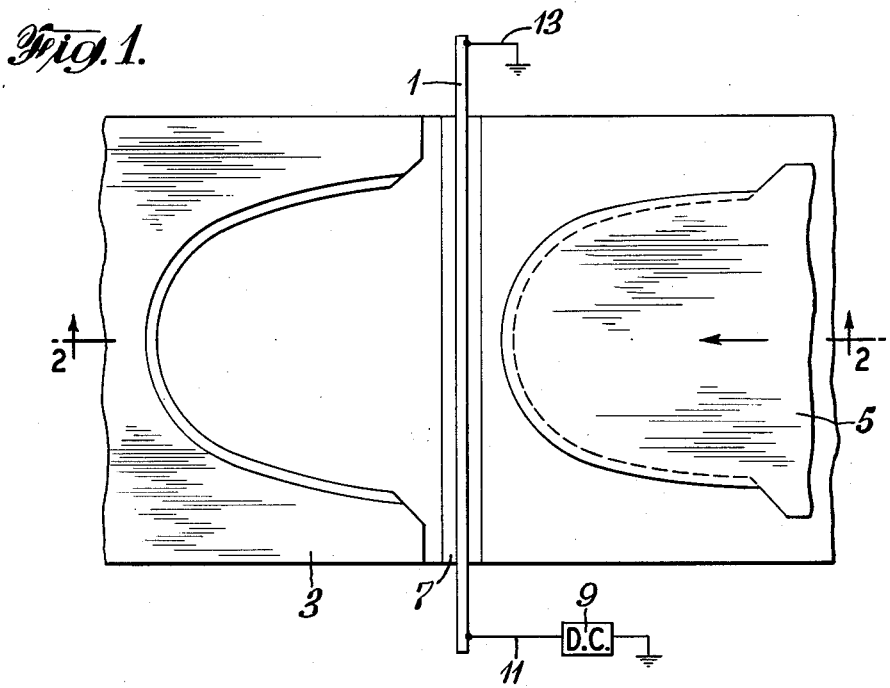
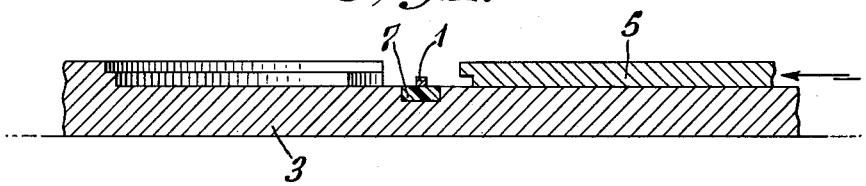
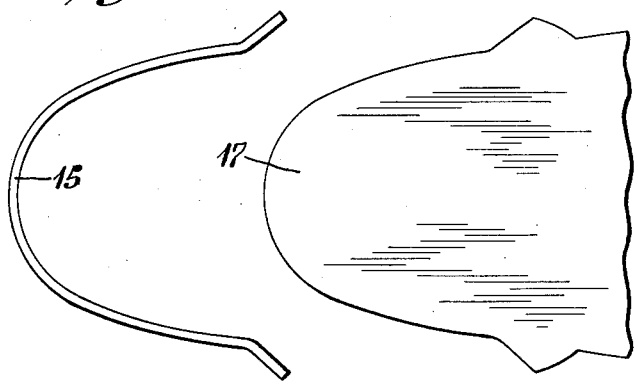
INVENTOR
NEIL J. ZACHMAN
BY Frederick J. McCarthy
ATTORNEY

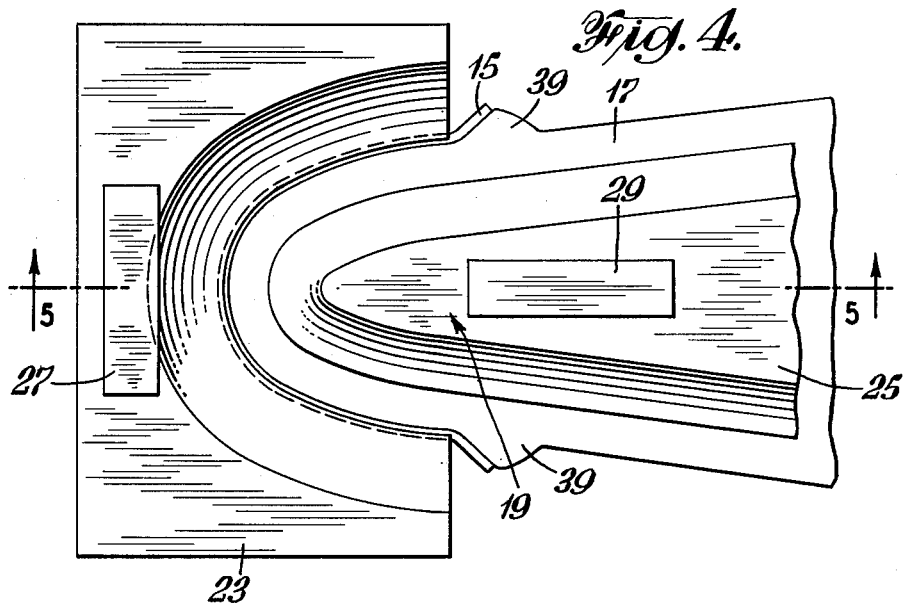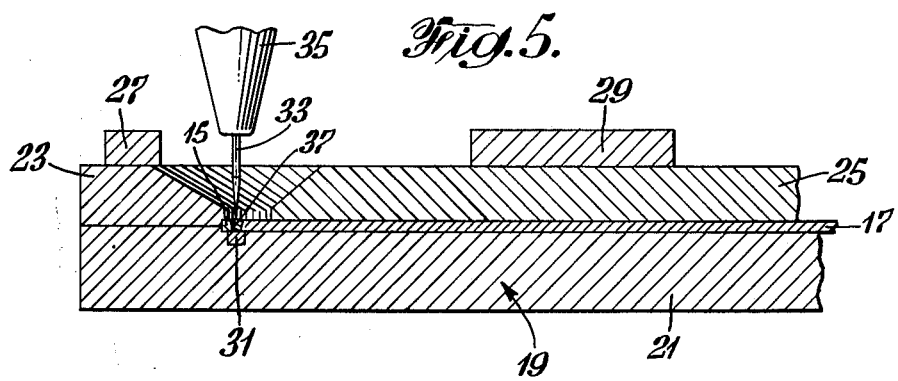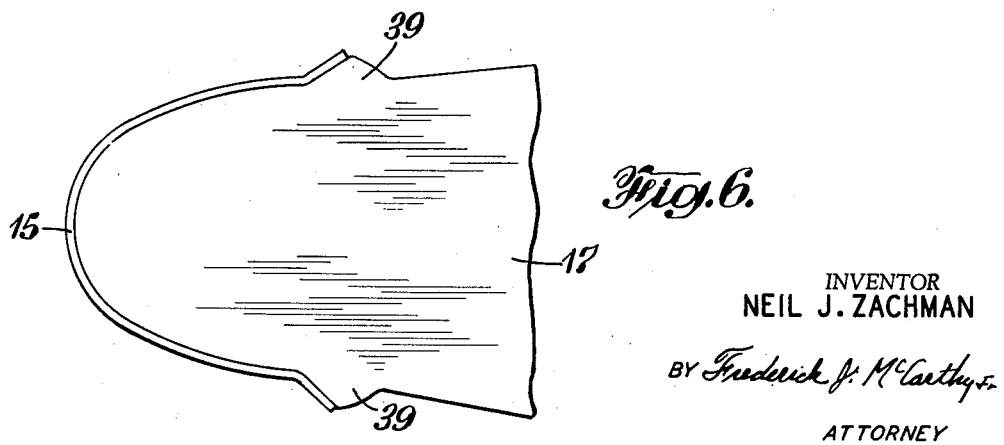

3,159,463
WEAR-RESISTANT COMPOSITE ARTICLE
Neil J. Zachman, Willowdale, Ontario, Canada, assignor to Union Carbide Canada Limited, Ontario, Canada, a corporation of Toronto, Ontario, Canada
Filed Nov. 24, 1961, Ser. No. 154,600
1 Claim. (Cl. 29—196)

The present invention relates to a method for providing a wear-resistant surface for steel articles. More particularly, the present invention relates to a method for providing steel articles with a wear-resistant surface formed of wrought cobalt-base alloy material.

In view of the very high degree of resistance of various cobalt-base alloys to abrasion, heat, corrosion, and erosion, there has been considerable effort in the art to provide relatively economical and simple methods for applying a surface of these materials on the edges of steel articles such as chain saw guide-bars and the like.

Various techniques have been proposed which have been directed primarily to the spraying or melting of cobalt-base alloy material onto the surface of the article to be hard-surfaced. Additionally, bead-welding processes have been suggested for joining cobalt-base alloy material to steel articles.

While deposition techniques and bead-welding have been successful in various applications, it has been found that, for economic and other reasons, there is a need to provide a more direct and less costly method for providing high-strength, wear-resistant surfaces on the edges of certain articles, notably chain saw guide bars, slitter knives, circular saws, scraper blades, chisels, surgical instruments and the like.

It is therefore an object of the present invention to provide a wear-resistant composite article which can be simply and directly manufactured.

Other objects will be apparent from the following description and claim taken in conjunction with the drawing in which:

FIGURE 1 shows, somewhat schematically, a plan view of apparatus suitable for hot-forming strips of wrough cobalt-base alloy for use in the present invention.

FIGURE 2 shows a sectional side elevation of the arrangement of FIGURE 1.

FIGURE 3 shows a plan view of a pre-formed strip of cobalt-base alloy and the steel article to which it is to be joined.

FIGURE 4 shows a plan view of a fixture suitable for holding a pre-formed strip of cobalt-base alloy material and a steel article during operation of the process of the present invention.

FIGURE 5 shows a sectional side-elevation view of the fixture illustrated in FIGURE 4 together with a tungsten electrode arc-melting apparatus and FIGURE 6 shows a plan view of a steel chain saw guide-bar after being provided with a wear-resistant surface in accordance with the present invention.

It has been discovered, as part of the present invention, and contrary to what would be expected by those skilled in the art, that certain cobalt-base alloys, in wrought form, can be effectively joined to steel articles without the use of additional metallic bonding material to provide a composite article having a strong wear-resistant surface. The cobalt-base alloys which have been found suitable for this purpose are those having a composition of between about 30 and 31 percent chromium, about 4.5 percent tungsten, between about 1.1 and 1.6 percent carbon, up to 1.5 percent molybdenum, up to 3 percent nickel, up to 3 percent iron, up to 2 percent silicon, up to 2 percent manganese, the balance being substantially all cobalt. Alloys of this composition are readily available commercially in the form of sheet, strip, plate and the like.

A process in accordance with the present invention for providing a wear-resistant surface on a steel article comprises arranging wrought cobalt-base alloy material of the aforesaid composition in closely adjoining relation with a steel article and fusing the adjoining, opposite portions of the steel article and wrought cobalt-base alloy material to form a mass of fused metal therebetween consisting essentially of material derived from the fused portions of the cobalt-base alloy and steel article; subsequently causing the fused metal to solidify; and post-heating the thus produced composite article to avoid fracture in the heat-affected zone of the steel portion of the composite article.

The above-described process is particularly directed to providing wear-resistant surfaces on the edges of chain saw guide bars and similar articles through the use of wrought cobalt-base alloy strips having a thickness of between about $\frac{1}{32}$ inch and $\frac{1}{4}$ inch. Such strips can be conveniently formed by shearing from sheets or plates of commercially available wrought material.

The present invention will be more fully understood by reference to the drawing which shows in FIGURES 1 and 2 a strip of cobalt-base alloy 1 arranged in a conventional hot-forming apparatus which is adapted to produce shapes corresponding to the edges of a steel article which is to be hard-surfaced. The apparatus comprises a female die 3 and a male die 5 which is actuated pneumatically or by other convenient means. Cobalt-base alloy strip 1 has a composition in the range previously set forth and is cut from a sheet of wrought material having a thickness substantially equal to the edge of the steel article which is to be hard-surfaced.

When installed in the hot-forming apparatus, the strip is mounted on insulator 7 and heated to between about 1800° F. and 2200° F. by means of electric current supplied by direct current source 9 through conductors 11 and 13. Other suitable techniques such as induction heating can also be used to pre-heat the cobalt-base alloy strip.

After being suitably pre-heated, the strip is hot-formed by virtue of the force exerted by male die 5 after which it is removed from the hot-forming apparatus. The thus produced pre-formed wrought strip is indicated as 15 in FIGURE 3 where it is shown with a plain carbon steel chain saw guide-bar 17 with which it is to be joined for the purpose of providing a wear-resistant surface.

The pre-formed strip and the steel chain saw guide-bar are arranged in closely adjoining relation by means of a suitable fixture indicated generally as 19 in FIGURES 4 and 5.

With reference to FIGURES 4 and 5, fixture 19 is seen to comprise a steel support member 21 and steel holding members 23 and 25. The steel article to be hard-surfaced, i.e., guide-bar 17, is located in fixture 19 as shown, together with the pre-formed wrought strip of cobalt-base alloy 15. Guide-bar 17 and cobalt-base alloy strip 15 are held in place by means of clamps 27 and 29. Additionally, a replaceable copper "back-up" 31 is arranged beneath the adjoining portions of guide-bar 17 and cobalt-base alloy strip 15.

FIGURE 5 additionally shows a tungsten electrode 33 which forms part of an arc-melting apparatus indicated generally as 35. The heat provided by the electrode is used to fuse the adjoining and opposite portions of guide-bar 17 and cobalt-base alloy 15.

When the pre-formed wrought cobalt-base alloy strip 15 and plain carbon steel guide-bar 17 have been arranged in closely adjoining relation as illustrated in FIGURES 4 and 5, the adjoining portions of the wrought cobalt-base alloy strip 15 and guide-bar 17 are fused by means to tungsten electrode 33 to provide a mass of fused metal between the alloy strip and the guide-bar. This mass of fused metal is indicated as 37 in FIGURE 5 and consists essentially of material derived from the steel guide-bar and cobalt-alloy strip.

The aforementioned fusion operation is accomplished so that the portion of the cobalt-base alloy strip remote from the steel guide-bar remains un-melted and substantially in as-wrought condition. Heliarc type arc-melting apparatus employing a tungsten electrode having no filler rod is preferred for fusing the adjoining portions of the wrought strip and steel guide-bar although other techniques such as short-arc, metal-arc, and resistance fusion processes can be employed in many applications of the present invention.

The fusion and subsequent solidification of the adjoining portions of strip 15 and guide-bar 17 produces a composite article having an edge which is formed of wrought cobalt-base alloy.

In order to prevent cracking in the steel base member of the thus produced composite article, post-heating is required after solidification of the fused metal which can be accomplished in accordance with those known techniques which are commonly applied in the production of bead-welded steel articles. With plain carbon steel guide-bars it has been found that a post-heating treatment of the composite article which results in the formation of an essentially bainite structure in the heat-affected zone of the guide-bar will prevent cracking in the steel. With 1070 steel (American Iron and Steel Institute classification) a sound composite article free from cracks is produced by post-heating the composite article immediately after re-solidification of the fused metal, at a temperature of between 500° F. and 600° F. for about 90 minutes with subsequent air-cooling to room temperature. The heat-affected zone as referred to herein, and as commonly understood, is that portion of the steel article whose structure has been altered by the heat of the fusion operation.

The hard-surfaced articles which have been produced by the above method have been found to be characterized by having a wear-resistant surface which is at least 40 to 50 percent stronger than surfaces previously provided by deposition or bead-welding techniques. It has also been found that the articles produced in accordance with the present invention have at least about twice the tensile strength and twice the resistance to cracking as compared to similar articles manufactured by deposition or bead-welding techniques.

In a preferred form of the present invention, the steel article which is to be given a wear-resistant surface is provided with extensions at the limits of the edge which is to be hard-surfaced. These extensions or tabs are indicated as 39 in FIGURE 6. Additionally, the strip 15 of cobalt-base alloy is pre-formed to a corresponding shape. Fusion of the adjoining portions of the strip and steel article is accomplished in the manner previously described, beginning at one of the tabs and finishing at the other. After the joining of the wrought strip to the steel guide-bar has been accomplished, the tabs and the portions of wrought strip joined thereto are machined from the article. In this embodiment of the invention any danger of "burn-through" in the steel article is avoided and a continuous high-quality bonding between the wrought cobalt-base alloy strip and steel base member is ensured.

The following example is presented to illustrate the present invention.

*Example I*

A 1/16 inch strip, 9 inches long, was sheared from a 0.090 inch sheet of cobalt-base alloy. The composition of the cobalt-base alloy sheet was as follows:

| | |
|---|---|
| Chromium | 30 |
| Tungsten | 4.5 |
| Molybdenum | 1.5 |
| Carbon | 1.6 |
| Nickel | 3.0 |
| Iron | 3.0 |
| Silicon | 2.0 |
| Manganese | 2.0 |
| Cobalt | Balance |

The strip was hot-formed in an apparatus of the type illustrated in FIGURES 1 and 2 and had a final shape as illustrated in FIGURE 3. The pre-formed strip and a steel guide-bar were arranged in a fixture of the type illustrated in FIGURES 4 and 5. The guide-bar, formed of 1070 steel, was 1/16 inch thick and was provided with two tabs as illustrated in the drawing. The radius of the curved portion of the guide-bar was 1.75 inches.

The inner portion of the pre-formed strip and the outer portion of the guide-bar were heated to provide a mass of fused metal therebetween by means of a Heliarc type melting apparatus. The fused metal was permitted to re-solidify to provide a composite article.

The electrode employed in the melting apparatus was a solid tungsten rod of 3/32 inch diameter ground to a point having an included angle of about 10° C.

In the joining of the cobalt-base alloy strip to the guide-bar, fusion of the respective adjoining portions was accomplished by heating with the tungsten electrode, starting at one tab and finishing at the other. The voltage applied to the electrode was 24 volts D.C. and the current was about 135 amperes. The speed of the tungsten electrode was between 14 and 20 inches per minute.

As soon as fusion and re-solidification was complete, the composite article was immediately placed in a furnace at 500° F. to 600° F. and maintained at this temperature for between 1½ and 2 hours. After this period the composite article was removed from the furnace and air-cooled.

The hard-surfaced article thus obtained was free from cracks and the region between the cobalt-base alloy strip and the steel guide-bar was strong and sound in all respects.

From the above disclosure it can be seen that the present invention provides a novel and relatively simple and economical method for providing hard-surfaced steel articles which are substantially stronger, and which have much greater resistance to cracking than hard-surfaced steel articles previously manufactured by deposition or bead-welding techniques.

What is claimed is:

As a manufacture, a composite wear-resistant article of the class described which comprises a steel base member and a surface member of wrought cobalt-base alloy integrally joined thereto having a composition of between about 30 and 31 percent chromium, about 4.5 percent tungsten, between about 1.1 and about 1.6 percent carbon, up to 1.5 percent molybdenum, up to 3 percent nickel, up to 3 percent iron, up to 2 percent silicon, up to 2 percent manganese, the balance being substantially all cobalt, said base member and said surface member being joined by re-solidified fused metal consisting essentially of material derived from fusion of the adjoining portions of said base member and said surface member, the portion of said surface member remote from the base member being essentially in as-wrought form.

References Cited in the file of this patent

UNITED STATES PATENTS

| | | |
|---|---|---|
| 2,071,808 | Anderson | Feb. 23, 1937 |
| 2,101,970 | Wissler | Dec. 14, 1937 |
| 2,149,656 | Armstrong | Mar. 7, 1939 |
| 2,288,184 | Dodson | June 30, 1942 |
| 2,654,946 | Rhodes | Oct. 13, 1953 |
| 2,844,868 | Cline | July 29, 1958 |